(12) United States Patent
Lipcsei et al.

(10) Patent No.: US 7,602,620 B2
(45) Date of Patent: Oct. 13, 2009

(54) CONTROLLER FOR POWER CONVERTER

(75) Inventors: Laszlo Lipcsei, San Jose, CA (US); Catalin Popovici, San Jose, CA (US)

(73) Assignee: O2Micro International Limited, Georgetown, Grand Cayman (KY)

( * ) Notice: Subject to any disclaimer, the term of this patent is extended or adjusted under 35 U.S.C. 154(b) by 565 days.

(21) Appl. No.: 11/026,725

(22) Filed: Dec. 30, 2004

(65) Prior Publication Data

US 2005/0190581 A1 Sep. 1, 2005
US 2008/0089098 A9 Apr. 17, 2008

Related U.S. Application Data

(63) Continuation-in-part of application No. 10/775,275, filed on Feb. 10, 2004, now Pat. No. 7,304,866.

(60) Provisional application No. 60/543,628, filed on Feb. 11, 2004.

(51) Int. Cl.
*H02M 3/335* (2006.01)
*H02J 1/00* (2006.01)

(52) U.S. Cl. ............................. 363/17; 363/15; 363/16

(58) Field of Classification Search ............... 363/21.11, 363/15–17, 20, 21, 24, 25, 121, 131–134, 363/22, 26
See application file for complete search history.

(56) References Cited

U.S. PATENT DOCUMENTS 6,538,905 B2   3/2003   Greenfeld et al. ............. 363/17
6,678,178 B2   1/2004   Lipcsei
6,813,173 B2 * 11/2004   Lipcsei ........................ 363/98
6,876,556 B2   4/2005   Zhu et al. ...................... 363/17

OTHER PUBLICATIONS

International Search Report with Written Opinion dated Oct. 4, 2005 (7pgs).
English translation of Office Action from related Chinese application dated Dec. 29, 2006, 6 pp.
Translation of Taiwan Office Action dated Jul. 8, 2006 received in related Taiwan Application (2 pages).
International Preliminary Report on Patentability dated Aug. 24, 2006 received in corresponding PCT Application No. PCT/US2005/004358 (5 pages).
English Translation of Chinese Office Action dated Sep. 7, 2007 (5 pages).

* cited by examiner

*Primary Examiner*—Akm E Ullah
*Assistant Examiner*—Richard V Muralidar
(74) *Attorney, Agent, or Firm*—Grossman, Tucker, Perreault & Pfleger, PLLC

(57) ABSTRACT

A controller for providing out of phase drive signals to a power converter having at least a first power unit and second power unit. The controller may comprise input circuitry adapted to receive a first signal from a first path and a second signal from a second path and provide an output signal in response to a difference between the first and second signals. The first signal may be representative of a current level of the first power unit during a first time interval and the first signal representative of a current level of the second power unit during a second time interval. The controller may further comprise output circuitry responsive to the output signal from the input circuitry to provide the out of phase drive signals to the first and second power unit.

15 Claims, 9 Drawing Sheets

CONTROLLER FOR POWER CONVERTER

CROSS REFERENCE TO RELATED APPLICATIONS

This application is a continuation-in-part application of U.S. Nonprovisional application Ser. No. 10/775,275 filed Feb. 10, 2004 now U.S. Pat. No. 7,304,866, the teachings of which are incorporated herein by reference, and claims the benefit of the filing date of U.S. Provisional Application Ser. No. 60/543,628, filed Feb. 11, 2004, the teachings of which are also incorporated herein by reference.

FIELD

This disclosure relates to controllers for power converters, and more particularly to controllers for DC to DC converters.

BACKGROUND

A DC to DC converter may be used in a variety of electronic devices to convert an input DC voltage to an output DC voltage. One DC to DC converter may have a transformer based full bridge primary and a current doubler rectifier secondary topology. In this instance, a full bridge circuit may be coupled across a primary winding of an isolation transformer and a current doubler rectifier circuit may be coupled across a secondary winding of the isolation transformer. The full bridge circuit may have four switches arranged in known bridge configuration. The current doubler rectifier may have two switches.

In one known arrangement, the four switches of the full bridge circuit may be controlled by four separate control signals and the two switches of the current doubler rectifier circuit may be controlled by an additional two control signals. Thus, six different control signals are required in this known arrangement. In addition, six switches may be responsive to these six associated control signals such that before each power transfer cycle, the secondary winding is shorted, but the primary winding is left open (the four switches of the full bridge are open). This known arrangement therefore requires a relatively larger core size for the transformer since for each cycle on the magnetization curve, the core will almost be brought back to the initial state where the core is not magnetized.

A DC to DC converter may have multiple transformer based power units. In one embodiment in the prior art, a controller for such a DC to DC converter may be a current-mode controller providing out of phase pulse width modulated signals to each power unit. Current sensing information for each power unit may be fed back to the controller. Separate current channel paths for each power unit may have many separate components contributing to mismatches between the different current channels for each power unit, e.g., mismatch can be +/−30% or even higher. This can degrade the efficiency and reliability of such DC to DC converters.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
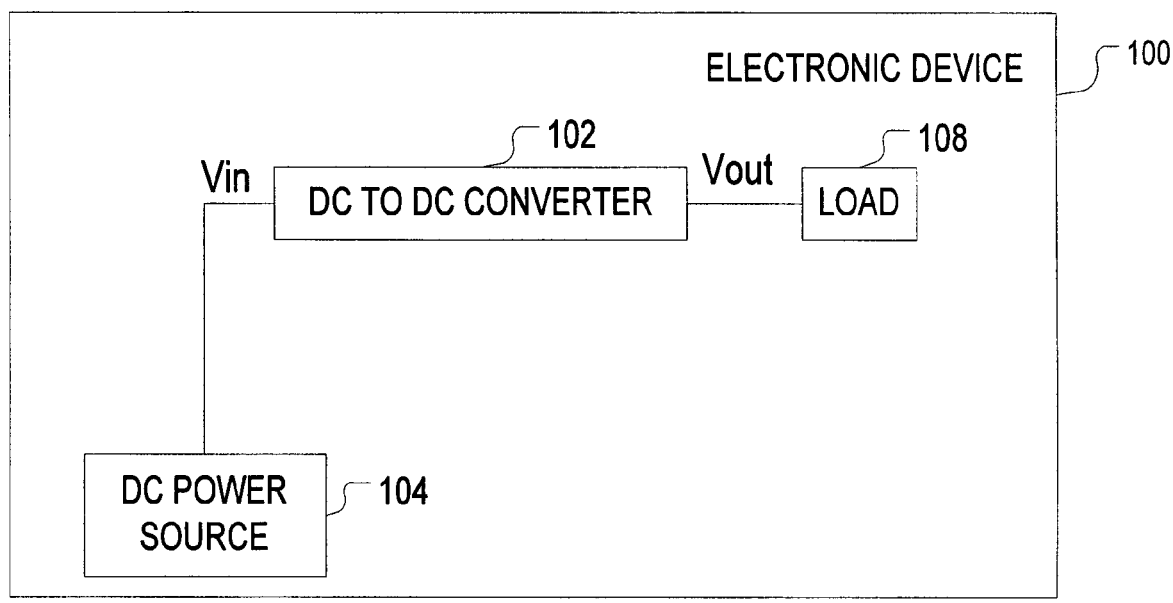
FIG. 1 is a block diagram of an electronic device having a DC to DC converter consistent with an embodiment.

FIG. 1 illustrates an electronic device 100 having a power converter, e.g., a DC to DC converter 102 consistent with an embodiment. The electronic device 100 may be any variety of electronic devices, including, but not limited to, a server computer, a desk top computer, a lap top computer, cell phone, personal digital assistant, etc. The electronic device 100 may receive power from any variety of power sources such as a DC power source 104. The DC power source may be any variety of power sources such as, for example, an AC/DC adapter, a DC "cigarette" type adapter, a battery, or a rechargeable battery. A rechargeable battery may include any type of rechargeable battery such as lithium-ion, nickel-cadmium, nickel-metal hydride batteries, or the like. The DC to DC converter 102 may receive a DC input voltage, Vin, and provide an output DC voltage, Vout, to a load 108. The output voltage, Vout, provided by the DC to DC converter 102 may be higher or lower than the input voltage Vin.

Figure 2:
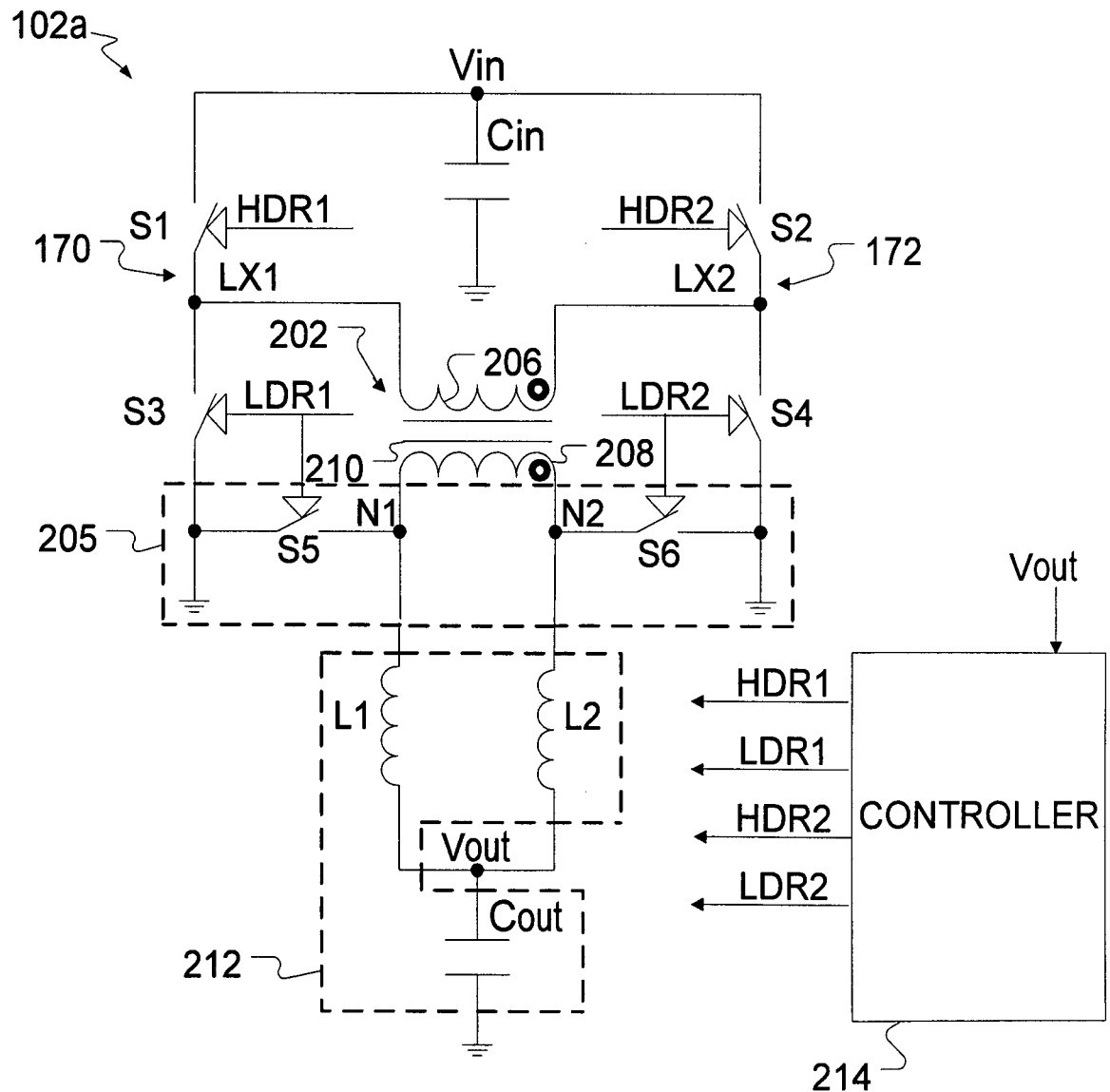
FIG. 2 is a circuit diagram of one embodiment for the DC to DC converter of FIG. 1.

FIG. 2 illustrates a circuit diagram of one embodiment 102a of the DC to, DC converter 102 of FIG. 1 in more detail. In general, the DC to DC converter 102a receives an input DC voltage, Vin, and provides a desired output DC voltage, Vout. The DC to DC converter 102a may include a transformer 202, a full bridge circuit, a rectifier circuit 205, and an output filter 212. The transformer 202 may have a primary winding 206, a secondary winding 208 and a core 210. The full bridge circuit may have a pair of paths 170, 172. Path 170 may also have a high side switch S1 and a low side switch S3 coupled in series. Path 170 may have a node LX1 coupled between switches S1 and S3. The high side switch S1 of path 170 may be coupled between an input voltage terminal and node LX1, while the low side switch S3 of path 170 may be coupled between node LX1 and ground. Similarly, path 172 of the full bridge circuit may have a high side switch S2 and a low side switch S4 coupled in series and have a node LX2 coupled between switches S2 and S4. The primary winding 206 of the transformer 202 may be coupled to nodes LX1 and LX2 of the full bridge circuit. The rectifier circuit 205 may be a current doubler rectifier circuit having switches S5, S6 coupled across the secondary winding 208 of the transformer 202. Switch S5 may be coupled between node N1 and ground while switch S6 may be coupled between node N2 and ground. The output filter 212 may include inductors L1, L2 and capacitor Cout.

A controller 214 may provide control signals HDR1, LDR1, HDR2, and LDR2 to the various switches S1, S2, S3, S4, S5, and S6. The switches S1 through S6 may be realized by any variety of transistors including bipolar and field effect transistors. In one embodiment, metal oxide semiconductor field effect transistors (MOSFETs) may be utilized. The controller 214 may also accept a signal from the DC to DC converter 102a representative of the output voltage Vout of the DC to DC converter and make switching decisions based, at least in part, on such signal.

Advantageously, control signal LDR1 may be provided to both the low side switch S3 of path 170 of the full bridge circuit and to switch S5 of the rectifier circuit 205 in order to simultaneously drive switches S3 and S5. In addition, control signal LDR2 may be provided to both the low side switch S4 of path 172 of the full bridge circuit and to switch S6 of the rectifier circuit 205 in order to simultaneously drive switches S4 and S6. As such, only four control signals HDR1, LDR1, HDR2, and LDR2 are necessary to control operation of all six switches S1 through S6.

Figure 3:
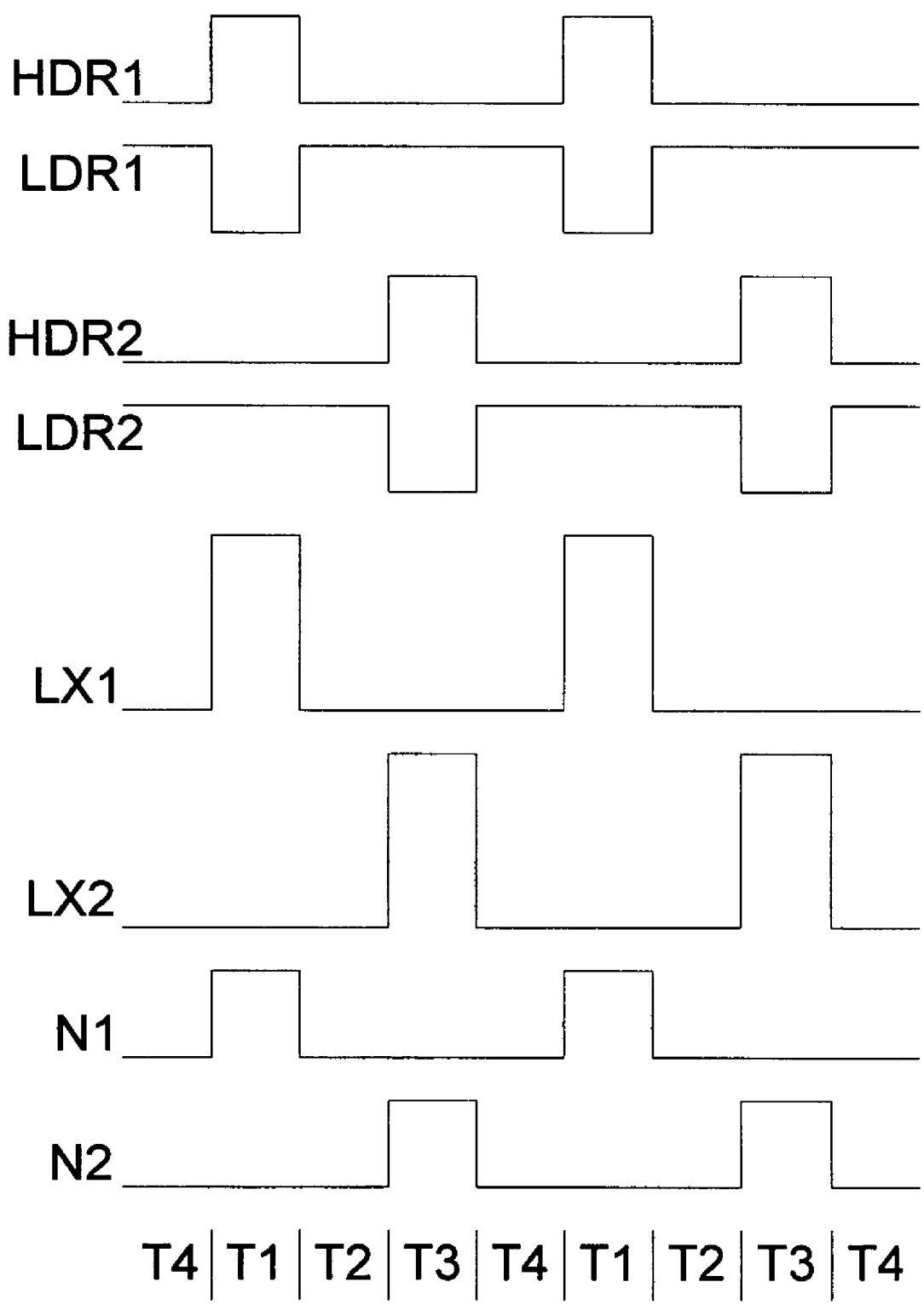
FIG. 3 is a timing diagram for the DC to DC converter of FIG. 2.

FIG. 3 illustrates a timing diagram for the control signals HDR1, LDR1, HDR2, and LDR2 provided to the switches S1 through S6 of the DC to DC converter of FIG. 2 to further detail operation of the DC to DC converter. FIG. 3 also illustrates exemplary voltage levels at various nodes LX1, LX2, N1, and N2 of the DC to DC converter 102a of FIG. 2 during various time intervals T1, T2, T3, and T4. In general, when an associated control signal for an associated switch is "high" the switch is ON and accordingly conducts current. In contrast, when an associated control signal for an associated switch is "low" the switch is OFF and accordingly does not conduct current. Those skilled in the art will also recognize other switch and control signal configurations where alternative switches may be responsive to alternative control signals.

During time interval T1, control signal HDR1 may be high, control signals LDR1 and HDR2 may be low, while control signal LDR2 may be high. In response to such control signals, switch S1 may be ON, switches S3 and S5 may be OFF, switch S2 may be OFF, and switches S4 and S6 may be ON. Therefore during time interval T1, node LX1 may be connected to the input DC voltage Vin through closed switch S1 and node LX2 may be connected to ground through closed switch S4. As such, node LX1 may have a voltage level associated with Vin while node LX2 may have a zero voltage level. Node N1 may have a voltage level associated with the voltage level at node LX1 due to the voltage level induced in the secondary winding 206 because of the current flowing in the primary winding 206. The relative voltage level at node N1 compared to the voltage at node LX1 during time interval T1 depends on the type of transformer 202. For a step down transformer delivering a lower output voltage Vout than input voltage Vin, the voltage level at node N1 during time interval T1 may be less than the voltage level at node LX1 as illustrated in FIG. 3.

Also during time interval T1, node N2, together with the corresponding side of the secondary winding 208, may be connected to ground through closed switch S6. As such, node N2 may have a zero voltage level during time interval T1. Therefore, during time interval T1 power may be transferred during this first power transfer time interval from the input voltage Vin via switch S1 and node LX1 to the primary winding 208, induced on the secondary winding 208 and visible at node N1.

During time interval T2, control signal HDR1 may be low, control signal LDR1 may be high, control signal HDR2 may be low, while control signal LDR2 may be high. In response to such control signals, switch S1 may be OFF, switches S3 and S5 may be ON, switch S2 may be OFF, and switches S4 and S6 may be ON. Advantageously, the primary winding 206 and the secondary winding 208 of the transformer 202 are both shorted during this time interval T2, which may be referred to herein as a reset time interval. As used herein, a "short" means a contact between two points in a circuit having a potential difference. In one embodiment, the primary winding 206 may be shorted by coupling the primary winding to a ground terminal, either directly to a ground terminal as in FIG. 2 or indirectly via a resistor Rsense as in FIG. 5.

In the embodiment of FIG. 2, the primary winding 206 may be shorted since both nodes LX1 and LX2 are coupled to ground via closed switches S3 and S4 (whiles switches S1 and S2 are open). The secondary winding 208 may also be shorted via closed switches S5 and S6. Since both the primary and secondary windings 206, 208 are shorted during this time interval T2, the energy stored in the transformer core 210 may be more fully preserved compared to shorting only the secondary winding 208 and leaving the primary winding 206 open as may be done in one embodiment of the prior art. Hence, a relatively smaller core size may be achieved. In addition, the nodes LX1, LX2, N1, and N2 may all have a zero voltage level during this reset time interval T2 given the state of switches S1 through S6.

Time interval T3 may be a second power transfer time period in which generally the state of switches S1, S4 and switches S2, S3 are alternated to apply opposite polarities of the input DC voltage Vin across the primary winding 206 of the transformer 202. For instance, during time interval T3 control signal HDR1 may be low, control signal LDR1 may be high, control signal HDR2 may be high, while control signal LDR2 may be low. In response to such control signals, switch S1 may be OFF, switches S3 and S5 may be ON, switch S2 may be ON, and switches S4 and S6 may be OFF. As such, node LX2 may have a voltage level associated with Vin while node LX1 may have a zero voltage level. Node N2 may have a voltage level associated with the voltage level at node LX2 due to the voltage level induced in the secondary winding 208 because of the current flowing in the primary winding 206. The relative voltage level at node N2 compared to the voltage at node LX2 during time interval T3 depends on the type of transformer 202. For a step down transformer, the voltage level at node N2 during time interval T3 may be less than the voltage level at node LX2 as illustrated in FIG. 3.

Also during time interval T3, node N1, together with the corresponding side of the secondary winding 208, may be connected to ground through closed switch S5. As such, node N1 may have a zero voltage level during time interval T3. Therefore, during time interval T3 power may be transferred during this second power transfer time interval from the input voltage Vin via switch S2 and node LX2 to the primary winding 206, induced on the secondary winding 208 and visible at node N2.

Finally, time interval T4 may be similar to the earlier detailed time interval T2. That is, control signal HDR1 may be low, control signal LDR1 may be high, control signal HDR2 may be low, while control signal LDR2 may be high. In response to such control signals, switch S1 may be OFF, switches S3 and S5 may be ON, switch S2 may be OFF, and switches S4 and S6 may be ON. Advantageously, the primary winding 206 and the secondary winding 208 of the transformer 202 may both be shorted during this time interval T4 as earlier detailed regarding time interval T2. In addition, the nodes Lx1, LX2, N1, and N2 may all have a zero voltage level during this reset time interval T4 given the state of switches S1 through S6.

Figure 4:
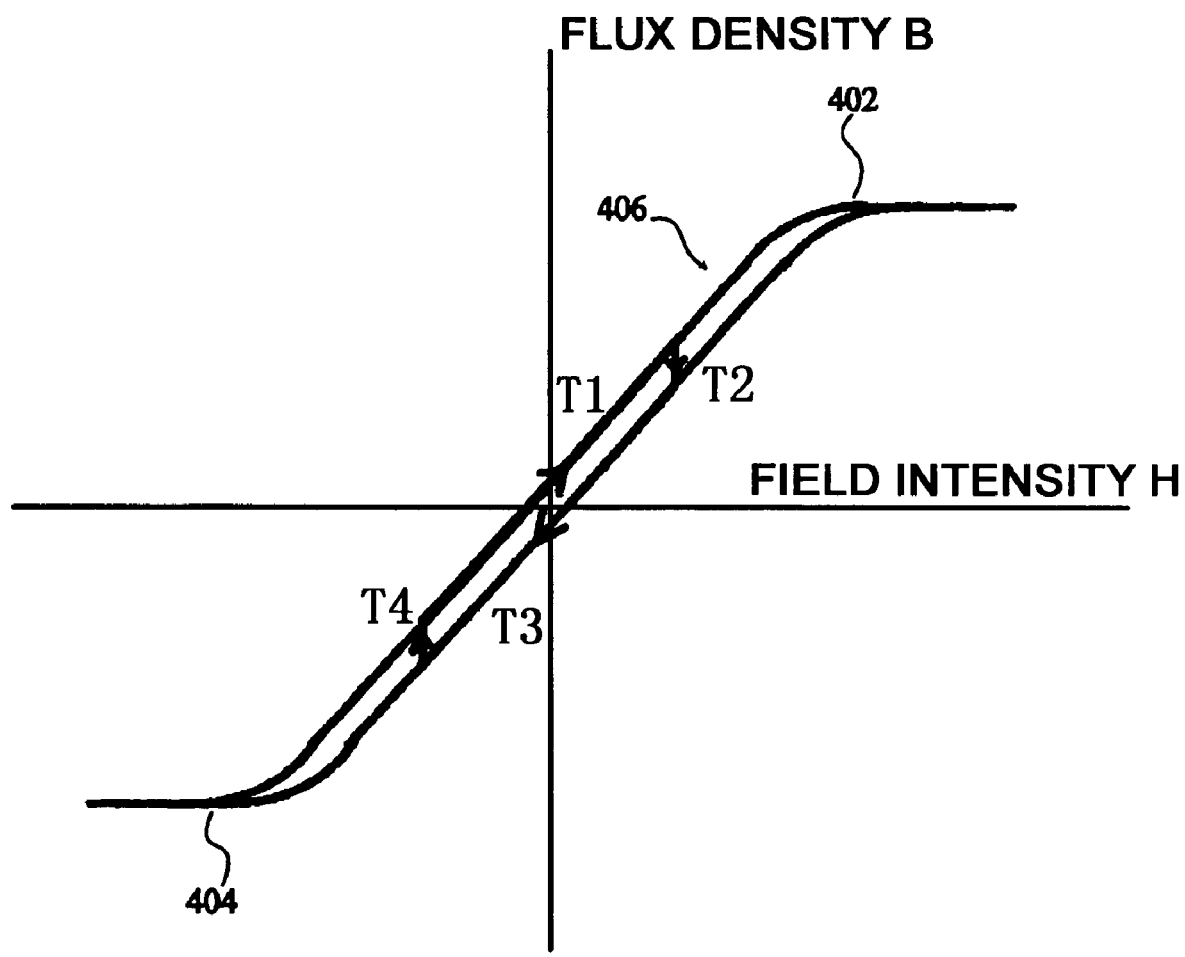
FIG. 4 is a plot of the core magnetization curve for the core of the transformer of FIG. 2.

FIG. 4 is an exemplary plot of the core magnetization curve for the core 210 of the transformer 202 of FIG. 2 plotting flux density (B) versus field intensity (H) for the core 210. The core reaches magnetic saturation at points 402, 404 on the hysteresis loop 406. Advantageously, before each power transfer cycle during times T1 and T3, the core maintains its magnetizing level from the previous cycle. For each cycle on the magnetization curve the core may start from a pre-charged value which may be discharged first (during time intervals T2 and T4) and then charged to the same level but in an opposite direction (during time intervals T1 and T3). In this way, the core is kept far from the saturation points 402, 404 with the operating point of the core 210 closer in proximity to zero on the B-H axis. As such, the physical size of the core 210 may advantageously be smaller than an embodiment in the prior art. In one example, by shorting both the primary and secondary winding the core energy conserved may be about 90% of maximum compared to about 60% of maximum when only the secondary winding is shorted. Therefore, the core size may decrease by about 30% in this example.

In addition to a reduced core size, the controller 214 for the DC to DC converter 102a need only provide four control signals HDR1, LDR1 and HDR2, LDR2. As illustrated in FIG. 3, control signals HDR1 and LDR1 have opposite phases during each time interval T1 through T4, e.g., control signal HDR1 is high when LDR1 is low and vice versa. Control signals HDR2 and LDR2 also have opposite phases during each time interval. In addition, each pair of opposite phase control signals (HDR1/LDR1 and HDR2/LDRD2) may be separated by a certain time interval, e.g., equal to time interval T2 in one embodiment as shown in FIG. 3. Advantageously, a controller 214 to provide such signals HDR1, LDR1 and HDR2, LDR2 may be readily available and inexpensive. For instance, if the switches S1 to S6 are implemented as MOSFETs, a portion of such a controller 214 may be a dual MOSFET driver as is known in the art. For example, such a dual MOSFET driver may provide switch control signals to a buck converter in another application.

The operation of the power converter 102a of FIG. 2 may short both the primary 206 and secondary 208 winding of the transformer 210 during reset time intervals T2 and T4 to preserve core magnetization. The operation of the power converter of FIG. 2 with reference to the timing diagram of FIG. 3 illustrates one of many ways to short the primary 206 and secondary 208 winding during a reset time interval. For example, in another embodiment both high side switches S1 and S2 may short the primary winding by closing and providing a path to another terminal having a voltage level different than the voltage level of the primary winding. This and some other methods of shorting the primary and the secondary winding may not be able to utilize readily available, low cost dual MOSFET drivers if the switches S1 to S6 are MOSFET transistors.

Figure 5:
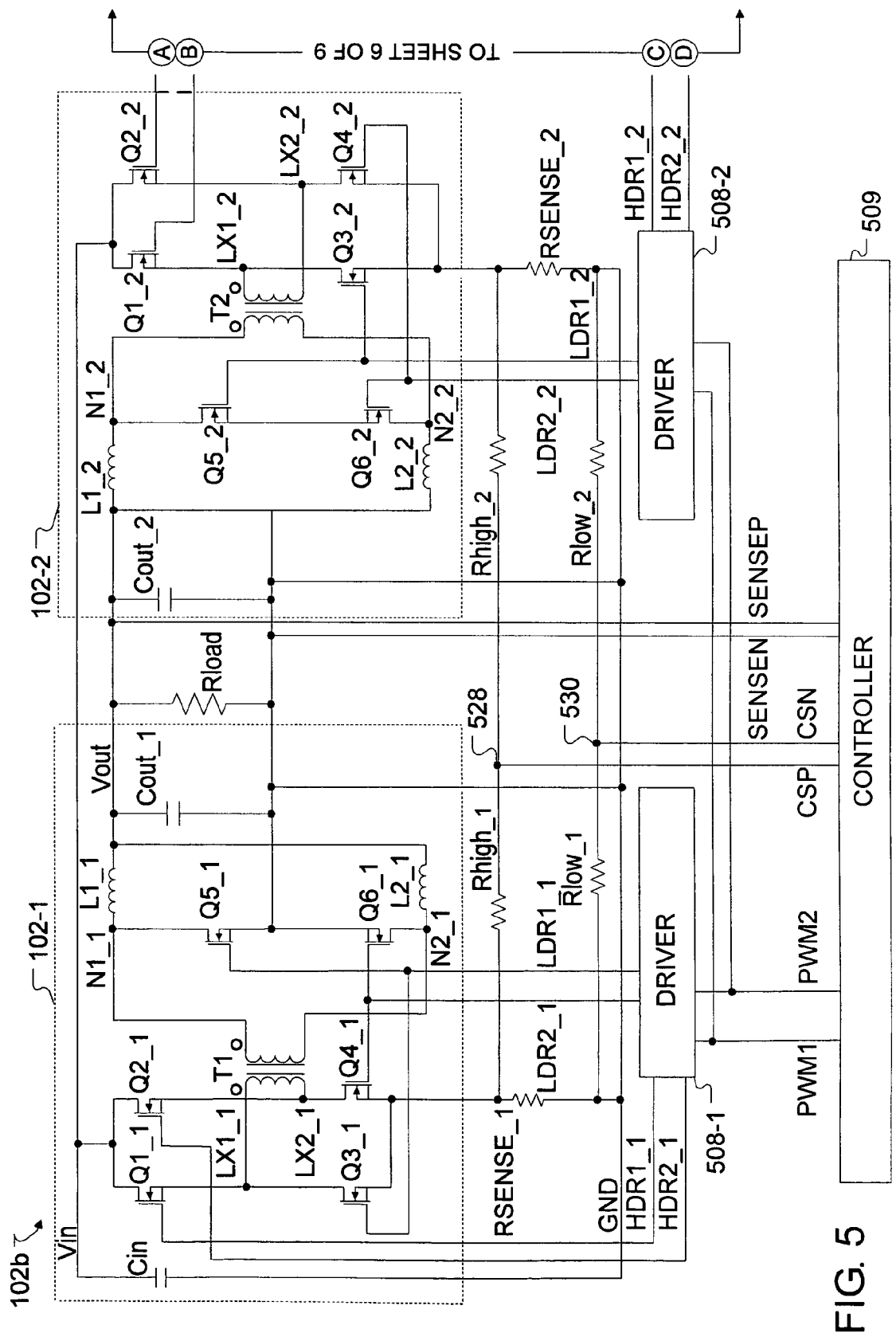
FIG. 5 is a circuit diagram of another embodiment of a DC to DC converter having a plurality of power units coupled in parallel.
Figure 5:
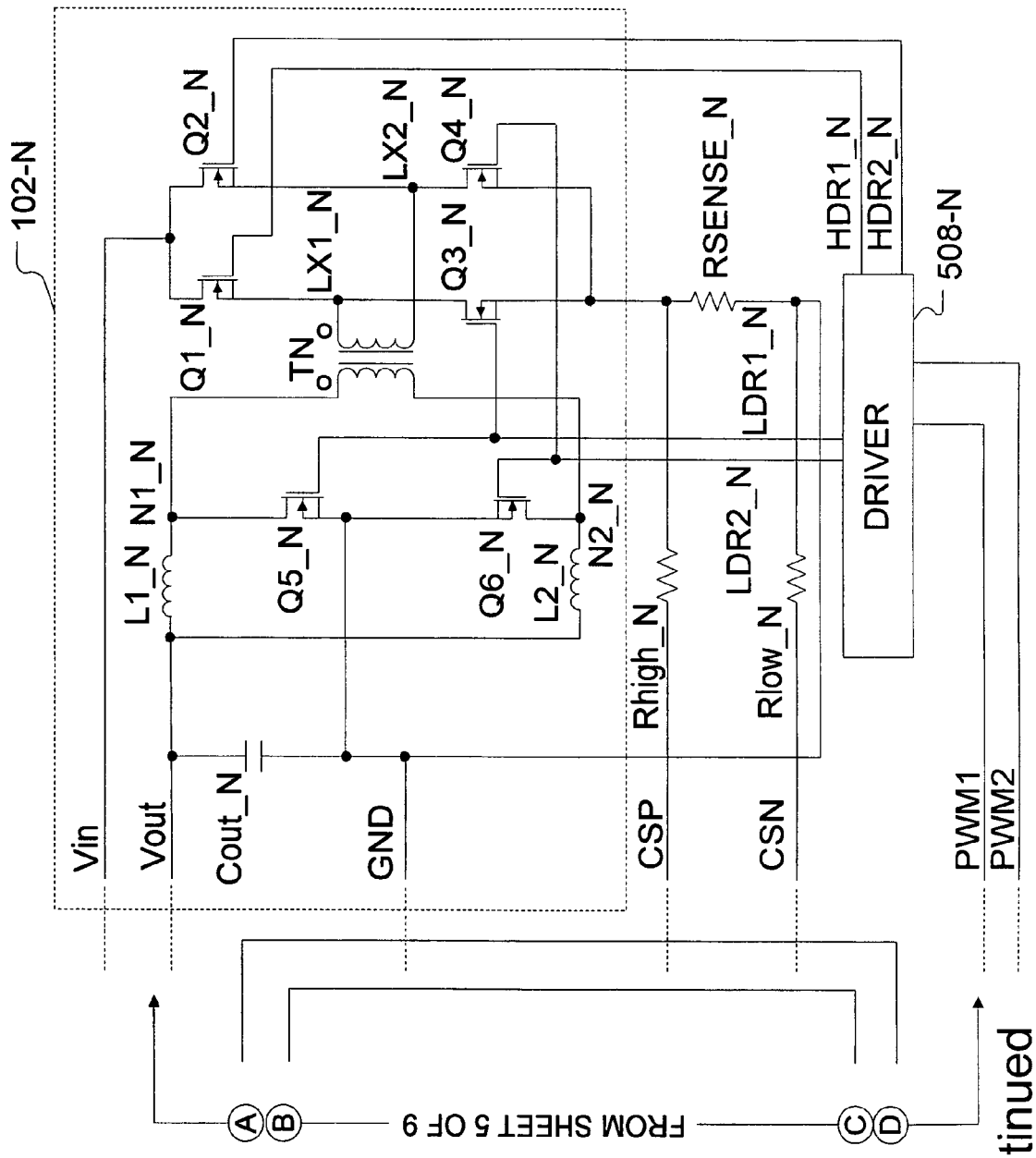

FIG. 5 illustrates another embodiment of a DC to DC converter 102b having a plurality of power units 102-1, 102-2 ... 102-N. Each power unit 102-1, 102-2 ... 102-N may be similar to the DC to DC converter 102a embodiment previously detailed in FIG. 2. Each power unit 102-1, 102-2 ... 102-N may be coupled together in parallel. Each power unit may also have an associated driver 508-1, 508-2 ... 508-N. In one embodiment, the drivers 508-1, 508-2 ... 508-N may be dual MOSFET drivers. Each driver may receive the same pulse width modulated signals PWM1 and PWM2 from controller 509. Signals PWM1 and PWM2 may be generated by controller 509 based on a cycle-by-cycle peak current detection technique. Since the same PWM1 and PWM2 signals are provided to each driver 508-1, 508-2 ... 508-N, there is an inherent balance between power units and N power units can be coupled in parallel without additional circuitry using the topology detailed in FIG. 5. That is, each additional power unit simply needs to couple its associated driver to the PWM1 and PWM2 signal and couple to the other power units in parallel.

Since each driver 508-1, 508-2 ... 508-N receives the same PWM1 and PWM2 signals, matching between each power unit 102-1, 102-2 ... 102-N is as good as the matching of the physical elements of each power unit, e.g., the inductors, transformers, transistors, resistors of each. Since control signals LDR1, LDR2, HDR1, and HDR2 from each driver are provided in response to the same PWM1 and PWM2 signals, the delays between power stages, e.g., the length of various time intervals T2 and T4 may also be matched. This may also prevent current flowing from one power unit's output to another since the conduction periods, e.g., time intervals T1 and T3, are also consistent. As such, the tolerances of the components of each power unit may be involved only as a percentage matching error since the zero load condition may be free of additional offset current between outputs of each power unit.

The current sensing schematic of FIG. 5 may utilize a summing resistive network in a differential topology to cancel any ground potential offsets between each power unit. Each section of the resistive network corresponding to one power unit may utilize a high side balancing resistor (Rhigh_1 ... Rhigh_N) and a low side balancing resistor (Rlow_1 ... Rlow_N). In one embodiment, all the high side balancing resistors (Rhigh_1 ... Rhigh_N) and all the low side balancing resistors (Rlow_1 ... Rlow_N) may be of equal value. The voltage between node 528 (CSP node) and node 530 (CSN node) is the instantaneous average value of the voltages developed across the N sensing resistors (R SENSE_1 ... R SENSE_N) as given by equation (1), where N is the number of power units 102-1, 102-2 ... 102-N.

$$V_{CSP} - V_{CSN} = \frac{V_{RSENSE\_1} + V_{RSENSE\_2} + \ldots + V_{RSENSE\_N}}{N} \quad (1)$$

Advantageously, the transient response speed of the embodiment of FIG. 5 is relatively fast compared to DC to DC converter having a single stage power unit due to the N times lower output equivalent inductance, where N is the number of power units. If all transformers for each power unit are substantially identical, the voltages applied across all the inductors is also equal. In addition, all the inductors are in parallel so the equivalent inductance will be N times lower. The output current ramping capability during load transients will also be N times higher.

Figure 6:
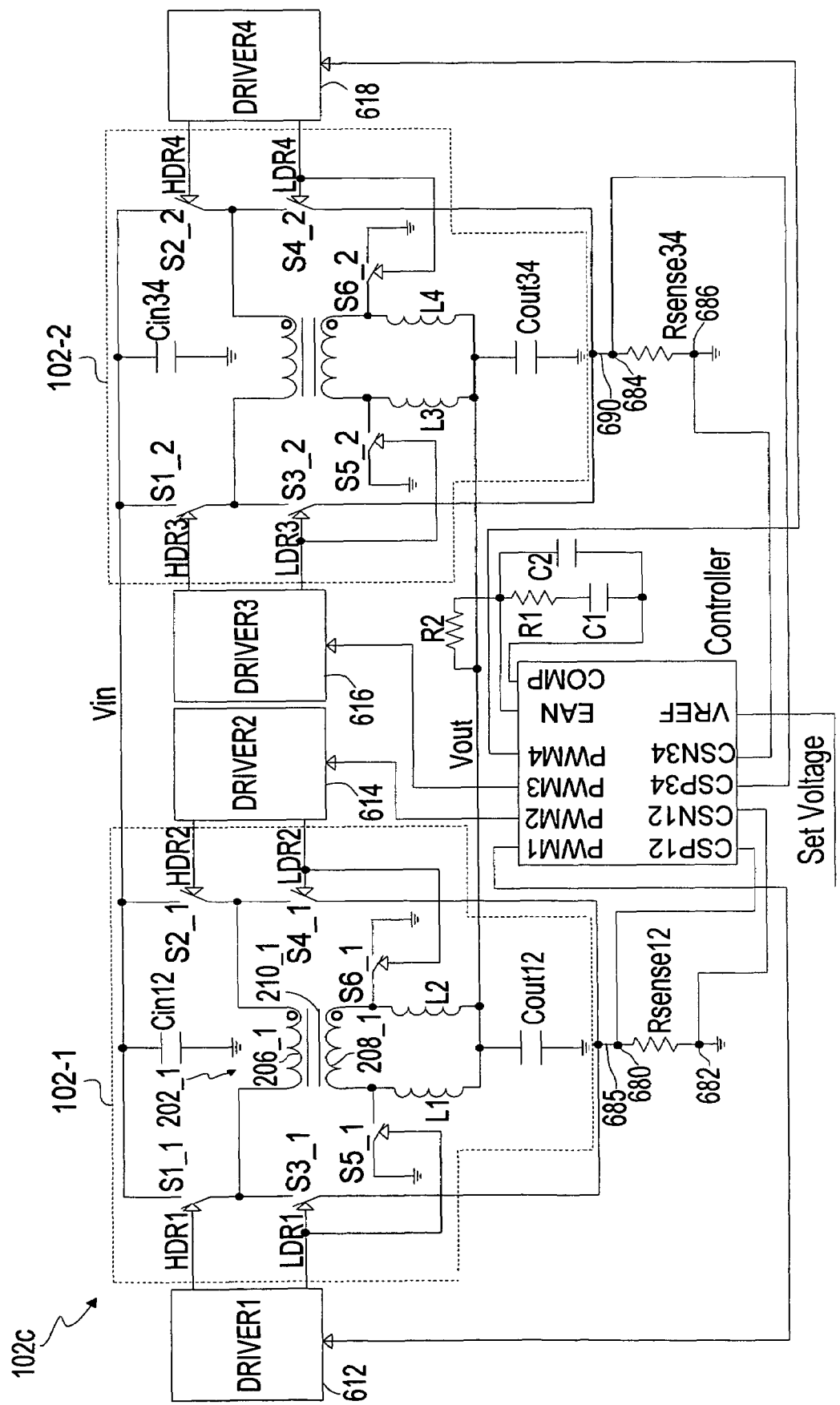
FIG. 6 is a circuit diagram of another embodiment of the DC to DC converter of FIG. 1 having two power units coupled in parallel and driven by out of phase drive signals from an associated controller.

FIG. 6 illustrates a circuit diagram of another embodiment 102c of the DC to DC converter 102 of FIG. 1 having two power units 102-1 and 102-2 coupled in parallel and a controller 602 consistent with an embodiment. Although two power units 102-1, 102-2 are illustrated, any plurality of power units may be coupled in parallel.

The controller 602 may provide out of phase drive signals, such as phase shifted pulse width modulated (PWM) signals PWM1, PWM2, PWM3, and PWM4, to associated drivers 612, 614, 616, and 618 for each power unit 102-1, 102-2. Each driver 612, 614, 616, and 618 may be responsive to its respective PWM input signals PWM1, PWM2, PWM3, and PWM4 to provide associated HDR and LDR control signals to drive associated switches of the power units 102-i, 102-2.

Each power unit 102-1, 102-2 may be similar to the embodiment detailed in FIG. 2 in conjunction with the timing diagram of FIG. 3. Hence, similar parts are labeled similarly and any repetitive description of the operation of each power unit 102-1, 102-2 is omitted herein for clarity. Each driver 612, 614, 616, 618 may be responsive to its respective PWM input signals, PWM1, PWM2, PWM3, and PWM4 to provide as associated control signal HDR in phase with its respective PWM input signal and a control signal LDR out of phase with its respective PWM input signal. For example, driver 612 may provide control signal HDR1 to switch S11 in phase with the PWM1 signal provided by the controller 602, and control signal LDR1, out of phase with HDR1, to switches S3_1 and S5_1.

In addition to providing drive signals such as PWM1, PWM2, PWM3, and PWM4, the controller 602 may receive various input signals. For instance, the controller 602 may receive an input signal at terminals CSP12 and CSN12 representative of a current level along path 685 from the first power unit 102-1. The CSP12 and CSN12 terminals may be coupled to nodes 680 and 682 respectively about sense resistor Rsense12 for the first power unit 102-1. Similarly, the controller 662 may receive another input signal at terminals CSP34 and CSN34 representative of a current level along path 690 from the second power unit 102-2. The CSP34 and CSN34 terminals may be coupled to nodes 684 and 686 respectively about sense resistor Rsense34 for the second power unit 102-2. Sense resistors Rsense12 and Rsense34 may function as a current sensor in that the voltage drop across the respective sense resistors is proportional to the current flow. The controller 602 may also accept a reference voltage signal VREF provided by any variety of reference sources (not illustrated). The controller 602 may also accept a signal at terminal EAN representative of the output voltage Vout of the DC to DC converter 102c. The output voltage level Vout may be scaled down by a voltage divider. The EAN terminal may be coupled to the inverting input terminal of the error amplifier 742.

Figure 7:
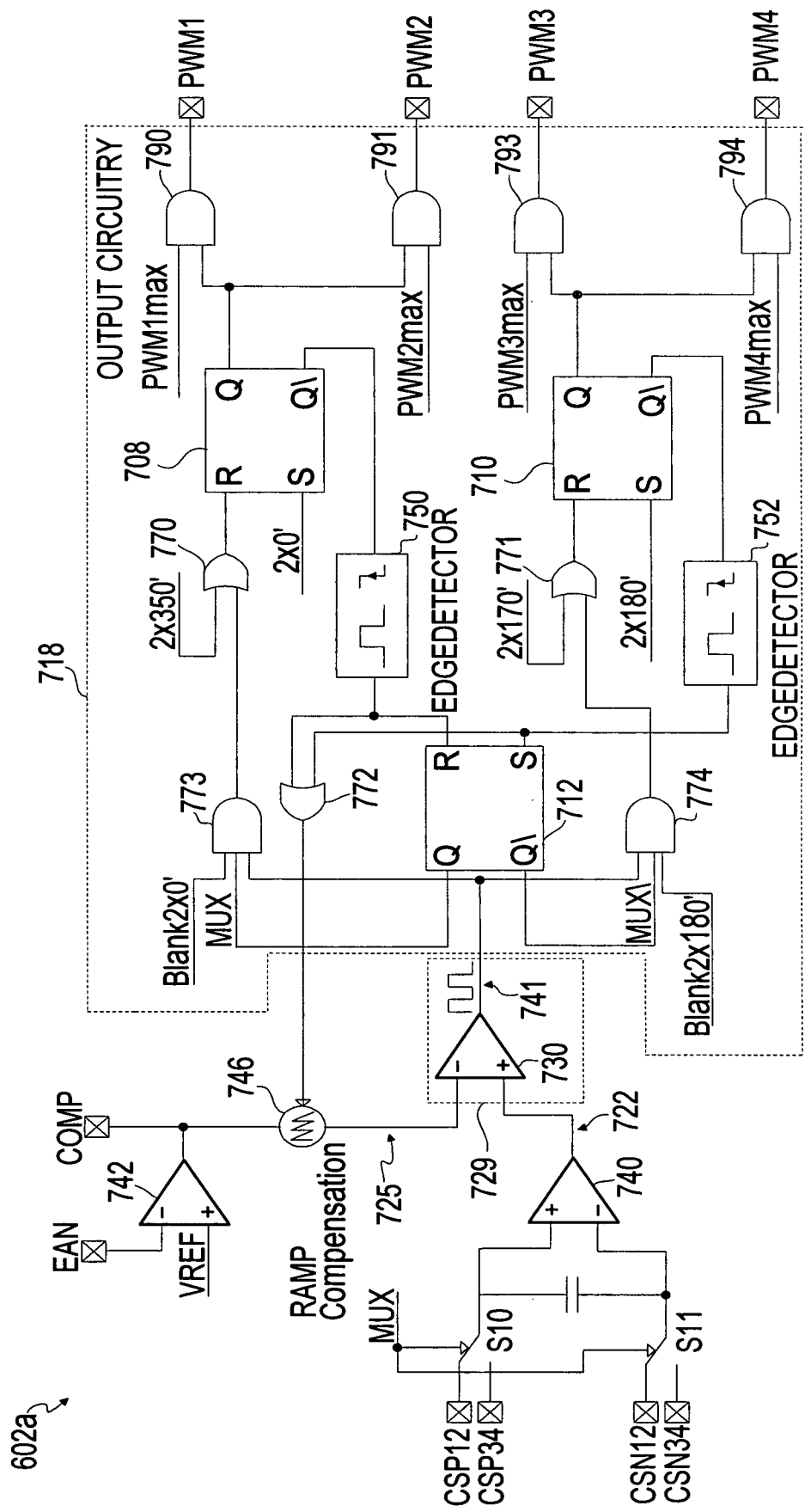
FIG. 7 is a circuit diagram of one embodiment of the controller of FIG. 6.
Figure 8:
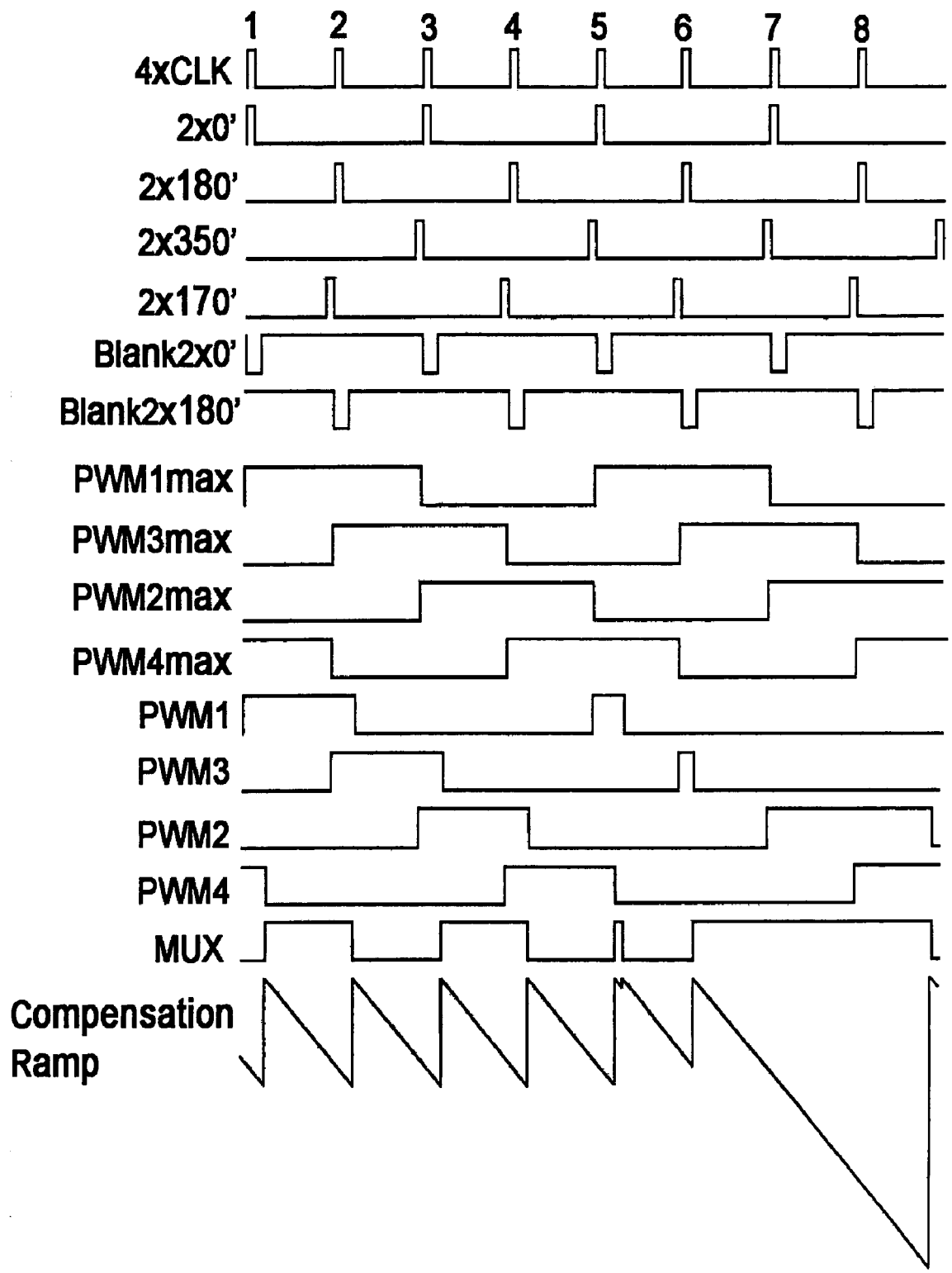
FIG. 8 is a timing diagram to illustrate the operation of the controller of FIG. 7.

FIG. 7 illustrates one embodiment 602a of the controller 602 of FIG. 6, while FIG. 8 is a timing diagram to illustrate operation of the controller 602a of FIG. 7. The controller 602a may include input circuitry 729 and output circuitry 718. As used herein, "circuitry" may comprise, for example, singly or in any combination, hardwired circuitry, programmable circuitry, state machine circuitry, and/or firmware that stores instructions executed by programmable circuitry. The input circuitry 729 may further include PWM circuitry to provide an output PWM signal. In one embodiment, the PWM circuitry may further comprise the PWM comparator 730 having its inverting input terminal coupled to path 725 and its noninverting input terminal coupled to path 722.

The PWM comparator 730 may receive the signals from paths 722, 725 and provide an output PWM signal having a pulse width or duty cycle dependent on the difference between the two signals. Advantageously, the signal provided by path 722 may be representative of a current level of the first power unit 102-1 during one time interval and representative of another current level of the second power unit 102-2 during another time interval. This may be accomplished by utilizing switches S10 and S11 to selectively couple either terminals CSP12, CSN12 or terminals CSP34, CSN34 to the path 722 via the same current amplifier 740. When the MUX signal output from flip flop 712 is a digital one, switches S10 and S11 may be in the position illustrated in FIG. 7 to couple the CSP12 and CSN12 terminals to the current amplifier 740. Alternatively, when the MUX signal is a digital zero, switches S10 and S11 may switch to an opposite position coupling the CSP34 and CSC34 terminals to the current amplifier 740. Advantageously, the same current amplifier 740 is utilized for both current channels from the first power unit 102-1 and second power unit 102-2 thereby avoiding offset that may otherwise occur if separate such current amplifiers were utilized for each current channel.

The PWM comparator 730 may also receive another signal at its inverting input terminal via path 725. Such signal may be a sawtooth ramp signal. Contributing to this sawtooth ramp signal may be a voltage amplifier 742 that compares a voltage difference between a reference voltage signal received at the VREF terminal and a voltage signal received at the EAN terminal. The sawtooth ramp signal 746 may utilize both the rising and falling edge of the MUX signal to set and reset the ramp signal.

The PWM comparator 730 may provide a PWM output signal via path 741 to output circuitry 718 in response to a difference between the sawtooth ramp signal input via path 725 and a current signal input via path 722. The PWM comparator 730 may provide a PWM output signal at a digital one level when the current amplifier 740 output exceeds the combined ramp compensation and error amplifier 742 output and a may provide a digital zero otherwise. The output circuitry 718 may be responsive to a variety of signals including the PWM signal from the PWM comparator 730 to provide output PWM1, PWM2, PWM3, and PWM4 signals.

In operation, the 2x0' clock signal input to the set terminal of flip flop 708 may go to a digital one to set the flip flop 708. Flip flop 708 may be considered a first channel flip flop associated with the first power unit 102-1 since the PWM1 and PWM2 signals provided to drivers 612 and 614 for the first power unit 102-1 are, at least in part, dependent on the output from the flip flop 708. Once set by the 2x0' clock signal, the output Q of flip flop 708 may then go to a digital one. The output Q may be provided to both AND gates 790, 791. If the PWM1max signal is a digital one and the PWM2max signal is a digital zero, then PWM1 will be set to a digital one and PWM2 will remain a digital zero. This is because both inputs to AND gate 790 would be a digital one in this instance, yet one input, PWM2max, to AND gate 791 would be a digital zero. In other words, the output Q of the flip flop 708 controls PWM1 in this instance if PWM1max is a digital one and PWM2max is a digital zero. PWM1max and PWM2max may have opposite phases as illustrated in the timing diagram of FIG. 8 such that PWM1 provided by AND gate 790 and PWM2 provided by AND gate 792 may not be a digital one at similar times.

The PWM1 signal may remain a digital one until flip flop 708 is reset. The flip flop 708 may be reset if the output of the OR gate 770 goes to a digital one. This may occur if the output of the AND gate 773 goes to a digital one or the 2x350' signal input to the OR gate goes to a digital one. When PWM1 is a digital one, as illustrated in FIG. 8, the MUX signal input to the AND gate 773 may be a digital one and the blank 2x0' input to the AND gate 773 may also be a digital one. Hence, the output of the AND gate 773 will also be a digital one once the PWM signal provided by the PWM comparator 730 goes to a digital one. If the MUX signal and blank 2x0' signal are both a digital one, the PWM comparator 730 essentially controls the output of the AND gate 773 and hence the resetting of the flip flop 708. The PWM comparator 730 will provide a digital one signal when the current amplifier 740 output (current amplifier 740 coupled to terminals CSP 12 and CSN 12 in this instance since MUX is a digital one) exceeds the combined ramp compensation and error amplifier 742 output and a will provide a digital zero otherwise.

If the PWM comparator 730 does not provide a digital one signal which would cause the output of the AND gate 773 to go to a digital one to reset the flip flop 708 via OR gate 770, the 2x350' signal input to OR gate 770 will eventually reset the flip flop 708 anyway. The 2x350' signal may be selected to limit the maximum duty cycle of PWM1 and PWM2 to an appropriate level, e.g., limiting the duty cycle of PWM1 and PWM2 to below 50%.

Once flip flop 708 is reset, two events may occur. First, the MUX signal may change states and, second, the sawtooth ramp signal provided to the inverting input terminal of the PWM comparator 730 may be reset. This is because as the flip flop 708 is reset, the Q\ output of flip flop 708 goes to a digital one. This is then detected by edge detector 750 which, in turn, resets flip flop 712. The resetting of flip flop 712 causes the MUX signal provided by flip flop 712 to change states from a digital one to a digital zero. The switches S10 and S11 may be responsive to this digital zero MUX signal to change position to couple terminals CSP34 and CSN34 to the current amplifier 740. Hence, the other current channel from the second power unit 102-2 is now presented to the PWM comparator 730 via the current amplifier 740 along path 722.

The second channel flip flop 710 may then be set by the 2x180' clock signal. Once set by the 2x180' clock signal, the output Q of flip flop 710 may then go to a digital one. If the PWM3max signal is a digital one and the PWM4max signal is a digital zero, then PWM3 will be set to a digital one and PWM4 will remain a digital zero. This is because both inputs to AND gate 793 would be a digital one in this instance, yet one input, PWM4max, to AND gate 794 would be a digital zero. In other words, the output Q of the flip flop 710 controls PWM3 in this instance if PWM3max is a digital one and PWM4max is a digital zero. PWM3max and PWM4max may have opposite phases as illustrated in the timing diagram of FIG. 8 such that PWM3 provided by AND gate 793 and PWM4 provided by AND gate 794 may not be a digital one at similar times.

The PWM3 signal may remain a digital one until flip flop 710 is reset in a similar way that PWM1 remained a digital one until flip flop 708 was reset. That is, the flip flop 710 may be reset if the output of the OR gate 771 goes to a digital one. This may occur if the output of the AND gate 774 goes to a digital one or the 2x170' signal input to the OR gate 771 goes to a digital one. When PWM3 is a digital one, the MUX\ signal input to the AND gate 774 may be a digital one and the blank2x180' input to the AND gate 774 may also be a digital one. Hence, the output of the AND gate 774 will also be a digital one once the PWM signal provided by the PWM comparator 730 goes to a digital one. If the MUX\ signal and blank2x180' signal are both a digital one, the PWM comparator 730 essentially controls the output of the AND gate 774 and hence the resetting of the flip flop 710. The PWM comparator 730 will provide a digital one signal when the current amplifier 740 output exceeds the combined ramp compensation and error amplifier 742 output and will provide a digital zero otherwise.

If the PWM comparator 730 does not provide a digital one signal which would cause the output of the AND gate 774 to go to a digital one to reset the flip flop 710 via OR gate 771, the 2x170' signal input to OR gate 771 will eventually reset the flip flop 710 anyway. The 2x170' signal may be selected to limit the maximum duty cycle of PWM3 and PWM4 to an appropriate level, e.g., limiting the duty cycle of PWM3 and PWM4 to below 50%.

Once flip flop 710 is reset, two events may occur. First, the MUX signal may change states and, second, the sawtooth ramp signal may be reset. This is because as the flip flop 710 is reset, the Q\ output of flip flop 710 goes to a digital one. This is then detected by edge detector 752 which, in turn, sets flip flop 712. The setting of flip flop 712 causes the MUX signal provided by flip flop 712 to change states from a digital zero to a digital one.

The flip flop 708 is the set again by the 2x0' clock signal as shown FIG. 8. However, as opposed to the first setting of the 2x0' clock signal, PWM1max is now a digital zero and PWM2max is now a digital one. Hence, setting of the flip flop 708 in this instance causes the PWM2 output provided by the output of AND gate 791 to go to a digital one since both inputs (Q from flip flop 708 and PWM2max) to AND gate 791 are digital ones and PWM1 is a digital zero since PWM1max is a digital zero. This then follows the same sequence as earlier detailed except the PWM comparator 730 when it goes to a digital one is now resetting the PWM2 signal.

The flip flop 710 is then set again by the 2x170' clock signal as shown FIG. 8. However, as opposed to the first setting of the 2x170' clock signal, PWM3max is now a digital zero and PWM4max is a digital one. Hence, setting of the flip flop 710 in this instance causes the PWM4 output provided by the output of AND gate 794 to go to a digital one since both inputs (Q from flip flop 710 and PWM4max) to AND gate 794 are digital ones and PWM3 is a digital zero since PWM3max is a digital zero. This then follows the same sequence as earlier detailed except the PWM comparator 730 when it goes to a digital one is now resetting the PWM4 signal. This sequence may then continue to set and reset output signals PWM1, PWM3, PWM2, and PWM4 thus providing out of phase drive signals PWM1, PWM3, PWM2, and PWM4. The sawtooth ramp signal may be reset as the MUX signal changes states, which also coincides with the falling edge of the PWM1, PWM2, PWM3, and PWM4 signals.

There is thus provided in one embodiment a controller for providing out of phase drive signals to a power converter having at least a first power unit and second power unit. The controller may comprise input circuitry adapted to receive a first signal from a first path and a second signal from a second path and provide an output signal in response to a difference between the first and second signals. The first signal may be representative of a current level of the first power unit during a first time interval and representative of a current level of the second power unit during a second time interval. The controller may further comprise output circuitry responsive to at least the output signal from the input circuitry to provide the out of phase drive signals to the first and second power unit.

There is also provided in another embodiment an electronic device comprising a power converter having at least a first power unit and a second power unit, and a controller for the power converter. The controller comprises input circuitry adapted to receive a first signal from a first path and a second signal from a second path and provide an output signal in response to a difference between the first and second signals. The first signal may be representative of a current level of the first power unit during a first time interval and representative of a current level of the second power unit during a second time interval. The controller may further comprise output circuitry responsive to at least the output signal to provide out of phase drive signals to the first and second power unit.

There is also provided a method comprising: comparing a first signal from a first path and a second signal from a second path and providing an output signal in response to a difference between the first and second signals, the first signal representative of a current level of the first power unit during a first time interval and the first signal representative of a current level of the second power unit during a second time interval;

and providing a plurality of drive signals to a power converter having at least a first power unit and second power unit.

In yet another embodiment there is provided a system comprising a power converter and a controller for the power converter. The power converter may comprise a first power unit and a second power unit, where each of the first and second power units comprise a transformer having a primary winding and a secondary winding. The power converter may further comprise a plurality of switches coupled to the primary and secondary winding, the plurality of switches responsive to at least one drive signal to short both the primary and secondary winding during a first reset time interval. The controller may provide the at least one drive signal to each of the first and second-power units. The controller may comprise input circuitry adapted to receive a first signal from a first path and a second signal from a second path and provide an output signal in response to a difference between the first and second signals. The first signal may be representative of a current level of the first power unit during a first time interval and of a current level of the second power unit during a second time interval. The controller may further comprise output circuitry responsive to at least the output signal to provide the at least one drive signal to each of the first and second power units.

Advantageously, the controller of these embodiments has only one input circuit, e.g., only one PWM comparator 730 in one embodiment. This PWM comparator 730 during one time interval receives a signal along path 722 representative of a current level of the first power unit 102-1 when switches S10 and S11 are coupled to terminal CSP12 and CSN12. The same PWM comparator 730 may also receive a signal along path 722 representative of a current level of the second power unit 102-2 when switches S10 and S11 are coupled to terminals CSP34 and CSN34. Therefore, the same PWM comparator 730 may be utilized to generate all PWM1, PWM2, PWM3, and PWM4 signals thereby avoiding offset that may otherwise occur if separate PWM comparators were utilized for each power unit 102-1, 102-2.

In addition, the same current amplifier 740 may be utilized for both current channels from both power units 102-1, 102-2 thereby also avoiding any current amplifier offset that may otherwise occur if separate current amplifiers were utilized for each power unit 102-1, 102-2. Furthermore, the sawtooth ramp signal provided to the PWM comparator 730 may be similarly developed to further avoid any compensation ramp mismatch. Therefore, any amplifier offset, PWM comparator offset, and compensation ramp mismatch may all be effectively eliminated. As a result, good current matching between the two transformer based power units 102-1, 102-2 may be achieved. Hence, efficiency and reliability of the DC to DC converter 102 controlled by such a controller may be also be improved.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A controller for providing out of phase drive signals to a power convener having at least a first power unit and second power unit, said controller comprising:
    input circuitry adapted to receive a first signal from a first path and a second signal from a second path and provide an output signal in response to a difference between said first and second signals, said first signal representative only of a current level of said first power unit during a first time interval and said first signal representative only of a current level of said second power unit during a second time interval; and
    output circuitry responsive to at least said output signal to provide said out of phase drive signals to said first and second power unit.

2. The controller of claim 1, wherein said input circuitry comprises pulse width modulation (PWM) circuitry and said output signal comprises a PWM signal.

3. The controller of claim 2, wherein said PWM circuitry comprises a PWM comparator having one input terminal coupled to said first path and another input terminal coupled to said second path, and wherein said second signal comprises a sawtooth ramp signal.

4. The controller of claim 3, wherein said drive signals comprise PWM signals, and wherein said sawtooth ramp signal is responsive to said output circuitry to reset at a falling edge of any one of said PWM signals.

5. The controller of claim 1, wherein said first path comprises a current amplifier, said current amplifier coupled to a current sensor of said first power unit during said first time interval and said current amplifier coupled to a current sensor of said second power unit during said second time interval.

6. An electronic device comprising:
    a power converter having at least a first power unit and a second power unit; and
    a controller for said power converter, said controller comprising:
        input circuitry adapted to receive a first signal from a first path and a second signal from a second path and provide an output signal in response to a difference between said first and second signals, said first signal representative only of a current level of said first power unit during a first time interval and said first signal representative only of a current level of said second power unit during a second time interval; and
        output circuitry responsive to at least said output signal to provide out of phase drive signals to said first and second power unit.

7. The electronic device of claim 6, wherein said input circuitry comprises pulse width modulation (PWM) circuitry and said output signal comprises a PWM signal.

8. The electronic device of claim 7, wherein said PWM circuitry comprises a PWM comparator having one input terminal coupled to said first path and another input terminal coupled to said second path, and wherein said second signal comprises a sawtooth ramp signal.

9. The electronic device of claim 8, wherein said drive signals comprise PWM signals, and wherein said sawtooth ramp signal is responsive to said output circuitry to reset at a falling edge of any one of said PWM signals.

10. The electronic device of claim 6, wherein said first path comprises a current amplifier, said current amplifier coupled to a current sensor of said first power unit during said first time interval and said current amplifier coupled to a current sensor of said second power unit during said second time interval.

11. A method comprising:
    comparing a first signal from a first path and a second signal from a second path and providing an output signal in response to a difference between said first and second signals, said first signal representative only of a current level of a first power unit during a first time interval and said first signal representative only of a current level of a second power unit during a second time interval; and providing a plurality of drive signals to a power convener having at least a first power unit and second power unit.

12. The method of claim 11, wherein said output signal comprises a pulse width modulated (PWM) signal.

13. The method of claim 12, wherein said second signal comprises a sawtooth ramp signal, and wherein said plurality of drive signals comprises a plurality of PWM signals.

14. The method of claim 13, further comprising:
resetting said sawtooth ramp signal in response to a falling edge of any of said plurality of PWM signals.

15. The method of claim 11, further comprising:
amplifying a first sensed signal from said first power unit with a current amplifier to provide said first signal representative only of said current level of said first power unit during said first time interval; and amplifying a second sensed signal from said second power unit with said current amplifier to provide said first signal representative only of said current level of said second power unit during said second time interval.

* * * * *